US008079810B2

(12) United States Patent
Liang

(10) Patent No.: US 8,079,810 B2
(45) Date of Patent: Dec. 20, 2011

(54) TURBINE AIRFOIL COOLING SYSTEM WITH DIVERGENT FILM COOLING HOLE

(75) Inventor: George Liang, Palm City, FL (US)

(73) Assignee: Siemens Energy, Inc., Orlando, FL (US)

(*) Notice: Subject to any disclaimer, the term of this patent is extended or adjusted under 35 U.S.C. 154(b) by 556 days.

(21) Appl. No.: 12/338,099

(22) Filed: Dec. 18, 2008

(65) Prior Publication Data

US 2010/0068067 A1 Mar. 18, 2010

Related U.S. Application Data

(60) Provisional application No. 61/097,317, filed on Sep. 16, 2008.

(51) Int. Cl.

| | |
|---|---|
| ***B63H 1/14*** | (2006.01) |
| ***B63H 7/02*** | (2006.01) |
| ***B64C 11/00*** | (2006.01) |
| ***B64C 5/14*** | (2006.01) |
| ***F01D 5/08*** | (2006.01) |
| ***F01D 5/18*** | (2006.01) |
| ***F01D 5/20*** | (2006.01) |
| ***F01D 5/14*** | (2006.01) |
| ***F03D 11/02*** | (2006.01) |
| ***F04D 29/58*** | (2006.01) |

(52) U.S. Cl. ................. 416/96 R; 416/97 R; 416/231 R

(58) Field of Classification Search ................ 416/96 R, 416/97 R, 231 R See application file for complete search history.

(56) References Cited

U.S. PATENT DOCUMENTS

| | | | | |
|---|---|---|---|---|
| 4,653,983 | A | 3/1987 | Vehr | |
| 4,664,597 | A * | 5/1987 | Auxier et al. | 416/97 R |
| 4,684,323 | A * | 8/1987 | Field | 416/97 R |
| 4,893,987 | A * | 1/1990 | Lee et al. | 416/92 |
| 4,992,025 | A * | 2/1991 | Stroud et al. | 416/97 R |
| 5,183,385 | A * | 2/1993 | Lee et al. | 416/97 R |
| 5,382,133 | A * | 1/1995 | Moore et al. | 415/115 |
| 5,688,104 | A * | 11/1997 | Beabout | 415/115 |
| 5,779,437 | A * | 7/1998 | Abdel-Messeh et al. | 415/115 |
| 6,176,676 | B1 * | 1/2001 | Ikeda et al. | 415/115 |
| 6,183,199 | B1 * | 2/2001 | Beeck et al. | 416/97 R |
| 6,602,052 | B2 * | 8/2003 | Liang | 416/97 R |
| 6,869,268 | B2 * | 3/2005 | Liang | 415/115 |
| 6,918,742 | B2 * | 7/2005 | Liang | 415/115 |
| 7,246,992 | B2 * | 7/2007 | Lee | 415/115 |
| 7,328,580 | B2 * | 2/2008 | Lee et al. | 60/752 |
| 7,374,401 | B2 * | 5/2008 | Lee | 416/97 R |
| 7,510,376 | B2 * | 3/2009 | Lee et al. | 416/97 R |
| 7,537,431 | B1 * | 5/2009 | Liang | 416/95 |
| 7,540,712 | B1 * | 6/2009 | Liang | 416/1 |
| 7,553,534 | B2 * | 6/2009 | Bunker | 428/137 |
| 7,645,123 | B1 * | 1/2010 | Liang | 416/241 R |
| 7,684,323 | B2 * | 3/2010 | Tiainen | 370/230 |

(Continued)

*Primary Examiner* — David Zarneke

(57) ABSTRACT

A cooling system for a turbine airfoil of a turbine engine having at least one divergent film cooling hole positioned in an outer wall defining the turbine airfoil is disclosed. The divergent film cooling hole includes a first section extending from an inner surface of the outer wall into the outer wall and a second section extending the first section and terminating at an outer surface of the outer wall. The divergent film cooling hole may provide a metering capability together with a divergent section that provides a larger film cooling hole breakout and footprint, which creates better film coverage and yields better cooling of the turbine airfoil. The divergent film cooling hole may provide a smooth transition, which allows the film cooling flow to diffuse better in the second section of the divergent film cooling hole.

19 Claims, 4 Drawing Sheets

U.S. PATENT DOCUMENTS

| | | | | |
|---|---|---|---|---|
| 7,798,776 | B1 * | 9/2010 | Liang | 416/97 R |
| 7,887,294 | B1 * | 2/2011 | Liang | 416/97 R |
| 7,997,886 | B2 * | 8/2011 | Kuo | 425/174.4 |
| 2006/0073015 | A1 * | 4/2006 | Liang | 416/97 R |
| 2008/0163604 | A1 * | 7/2008 | Spangler | 60/39.83 |
| 2009/0169394 | A1 * | 7/2009 | Crow et al. | 416/96 R |
| 2010/0028163 | A1 * | 2/2010 | James et al. | 416/96 R |
| 2010/0040478 | A1 * | 2/2010 | Abdel-Messeh et al. | 416/97 R |

* cited by examiner

TURBINE AIRFOIL COOLING SYSTEM WITH DIVERGENT FILM COOLING HOLE

CROSS-REFERENCE TO RELATED APPLICATION

This patent application claims the benefit of U.S. Provisional Patent Application No. 61/097,317, filed Sep. 16, 2008, which is incorporated by reference in its entirety.

FIELD OF THE INVENTION

This invention is directed generally to turbine airfoils, and more particularly to cooling systems in hollow turbine airfoils.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies and turbine vanes to these high temperatures. As a result, turbine airfoils must be made of materials capable of withstanding such high temperatures. In addition, turbine airfoils often contain cooling systems for prolonging the life of the turbine airfoils and reducing the likelihood of failure as a result of excessive temperatures.

Typically, turbine airfoils contain an intricate maze of cooling channels forming a cooling system. Turbine airfoils include turbine blades and turbine vanes. Turbine blades are formed from a root portion having a platform at one end and an elongated portion forming a blade that extends outwardly from the platform coupled to the root portion. The blade is ordinarily composed of a tip opposite the root section, a leading edge, and a trailing edge. Turbine vanes have a similar configuration except that a radially outer and is attached to a shroud and a radially inner end meshes with a rotatable rotor assembly. The cooling channels in a turbine airfoil receive air from the compressor of the turbine engine and pass the air through the airfoil. The cooling channels often include multiple flow paths that are designed to maintain all aspects of the turbine airfoil at a relatively uniform temperature. However, centrifugal forces and air flow at boundary layers often prevent some areas of the turbine airfoil from being adequately cooled, which results in the formation of localized hot spots. Localized hot spots, depending on their location, can reduce the useful life of a turbine airfoil and can damage a turbine blade to an extent necessitating replacement of the airfoil.

In one conventional cooling system, diffusion orifices have been used in outer walls of turbine airfoils. Typically, the diffusion orifices are aligned with a metering orifices that extends through the outer wall to provide sufficient cooling to turbine airfoils. The objective of the diffusion orifices is to reduce the velocity of the cooling fluids to create an effective film cooling layer. Nonetheless, many conventional diffusion orifices are configured such that cooling fluids are exhausted and mix with the hot gas path and become ineffective.

SUMMARY OF THE INVENTION

This invention relates to a turbine airfoil cooling system for a turbine airfoil used in turbine engines. In particular, the turbine airfoil cooling system is directed to a cooling system having an internal cavity positioned between outer walls forming a housing of the turbine airfoil. The cooling system may include a divergent film cooling hole in the outer wall that may be adapted to receive cooling fluids from the internal cavity, meter the flow of cooling fluids through the divergent film cooling hole, and release the cooling fluids into a film cooling layer proximate to an outer surface of the airfoil. The divergent film cooling hole may allow the cooling fluids to diffuse to create better film coverage and yield better cooling of the turbine airfoil.

The turbine airfoil may be formed from a generally elongated airfoil having a leading edge, a trailing edge and at least one cavity forming a cooling system in the airfoil. An outer wall forming the generally elongated airfoil may include at least one divergent film cooling hole positioned in the outer wall that provides a cooling fluid pathway between the at least one cavity forming the cooling system and an environment outside of the airfoil. The divergent film cooling hole may include a first section extending from an inner surface of the outer wall into the outer wall and a second section extending the first section and terminating at an outer surface of the outer wall. In one embodiment, the first and second sections of the at least one divergent film cooling hole may have approximately equal lengths, or may have other appropriate length relationships. A bottom surface, which may be a downstream surface, of the second section may be generally planar and may extend from an intersection at the first and second sections toward the outer surface of the outer wall at an angle relative to a longitudinal axis of the divergent film cooling hole of between about five degrees and about fifteen degrees. In particular, the bottom surface may be positioned at an angle relative to the longitudinal axis of the divergent film cooling hole of about ten degrees.

The first side surface of the second section may be positioned at an angle relative to the longitudinal axis of the divergent film cooling hole of between about five degrees and about fifteen degrees. In particular, the first side surface of the second section may be positioned at an angle relative to the longitudinal axis of the at least one divergent film cooling hole of about ten degrees. The first side surface may also be angled in a different direction that further widens the outlet in the outer wall. The first side surface may be angled such that an edge that intersects the top surface is further away from the longitudinal axis of the divergent film cooling hole than an edge that intersects the bottom surface to provide a larger outlet for the divergent film cooling hole. In particular, the first side surface may be positioned at an angle of between about ten degrees and about forty five degrees from a plane orthogonal to the bottom surface parallel with the longitudinal axis, and in one embodiment, the first side surface may be positioned at an angle of about ten degrees relative to the plane orthogonal to the bottom surface and parallel to the longitudinal axis.

The second side surface of the second section, which may be generally opposite to the first side surface, may be positioned at an angle relative to the longitudinal axis of the divergent film cooling hole of between about five degrees and about fifteen degrees. In particular, the second side surface of the second section may be positioned at an angle relative to the longitudinal axis of the at least one divergent film cooling hole of about ten degrees. The second side surface may also be angled in a different direction such that an edge that intersects the top surface is further away from the longitudinal axis of the divergent film cooling hole than an edge that intersects the bottom surface to provide a larger outlet for the divergent film cooling hole. For instance, the second side surface may be positioned at an angle of between about ten degrees and about forty five degrees from a plane orthogonal to the bottom surface and parallel with the longitudinal axis. In one embodiment, the second side surface may be positioned at an angle of about ten degrees from the plane orthogonal to the bottom surface.

The divergent film cooling hole may be positioned such that a longitudinal axis of the hole extends generally chordwise in the turbine airfoil. In another embodiment, the longitudinal axis of the at least one divergent film cooling hole may be nonparallel and nonorthogonal with the leading edge. In such embodiments, the upstream side surface may have less divergence from the longitudinal axis than the downstream side surface. Thus, the first side surface may be positioned at an angle less than the second side surface relative to the longitudinal axis. As such, the longitudinal axis may be positioned such that an outlet of the second section is positioned radially outward more than an inlet of the first section. The longitudinal axis of the at least one divergent film cooling hole may be positioned at an angle between about 15 degrees and about 85 degrees relative to an axis in a chordwise direction. In particular, the longitudinal axis of the at least one divergent film cooling hole may be positioned at an angle between about 35 degrees and about 55 degrees relative to an axis in a chordwise direction.

During operation, cooling fluids, such as gases, are passed through the cooling system. In particular, cooling fluids may pass into the internal cavity, enter the inlet of the first section of the divergent film cooling hole, pass through the first section, pass through the second section and exit the divergent film cooling hole through the outlet. The first section may operate to meter the flow of cooling fluids through the divergent film cooling hole. The second section may enable the cooling fluids to undergo multiple expansion such that more efficient use of the cooling fluids may be used during film cooling applications. Little or no expansion occurs at top surface, which is the upstream side, of the divergent film cooling hole. This configuration enables an even larger outlet of the divergent film cooling hole, which translates into better film coverage and yields better film cooling. The second section creates a smooth divergent section that allows film cooling flow to spread out of the divergent film cooling hole at the outlet better than conventional configurations. Additionally, the second section minimizes film layer shear mixing with the hot gas flow and thus, yields a higher level of cooling fluid effectiveness.

An advantage of the divergent film cooling hole is that the divergent cooling hole includes compound divergent side walls configured to create efficient use of cooling fluids in forming film cooling flows.

Another advantage of the divergent film cooling holes is that the divergent film cooling hole minimizes film layer shear mixing with the hot gas flow and thus yields higher film effectiveness.

Yet another advantage of the divergent film cooling hole is a larger outlet at the outer surface of the outer wall is created by angling the side surfaces relative to a plane orthogonal to the bottom surface and parallel to the longitudinal axis.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
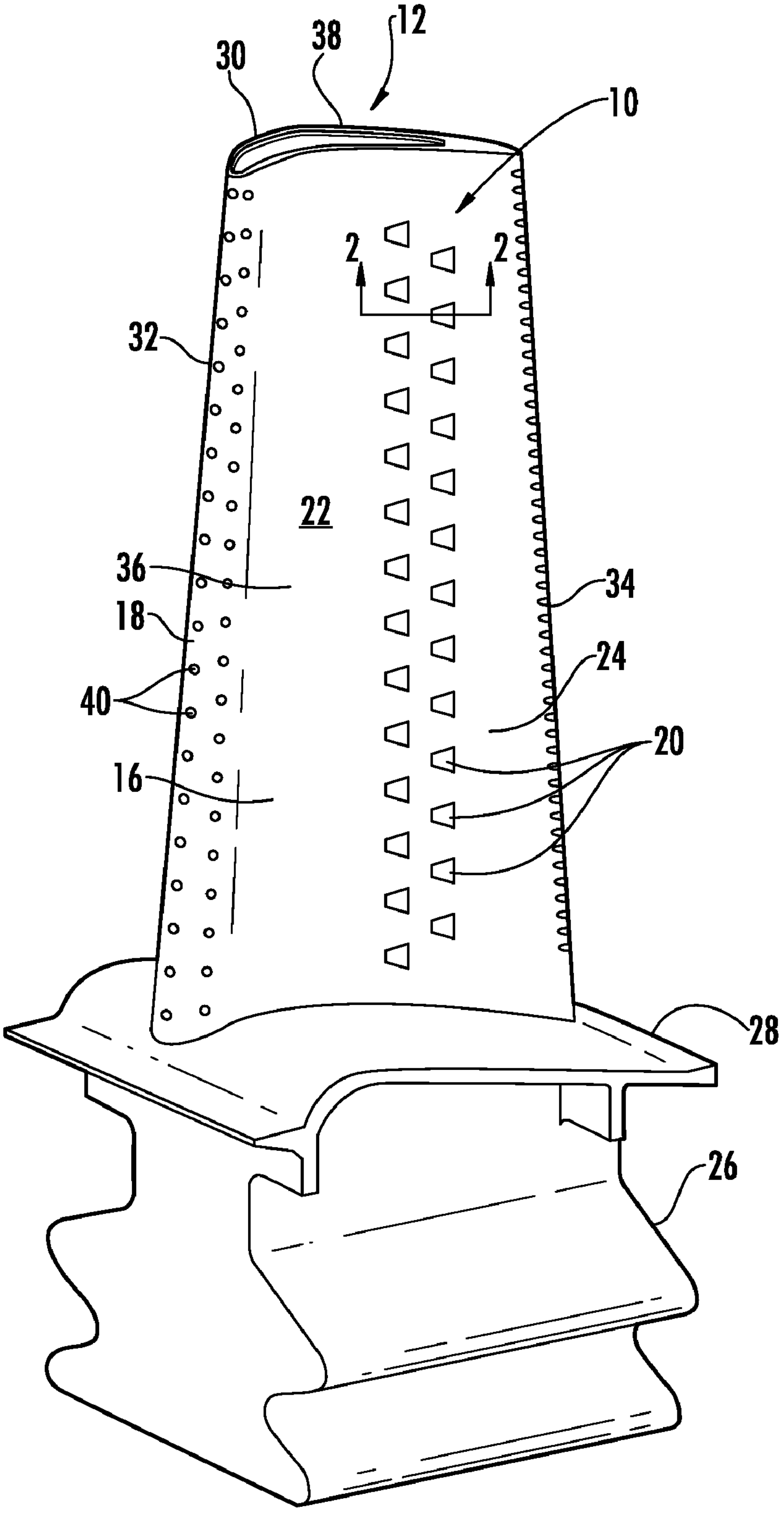
FIG. 1 is a perspective view of a turbine airfoil having features according to the instant invention.
Figure 2:
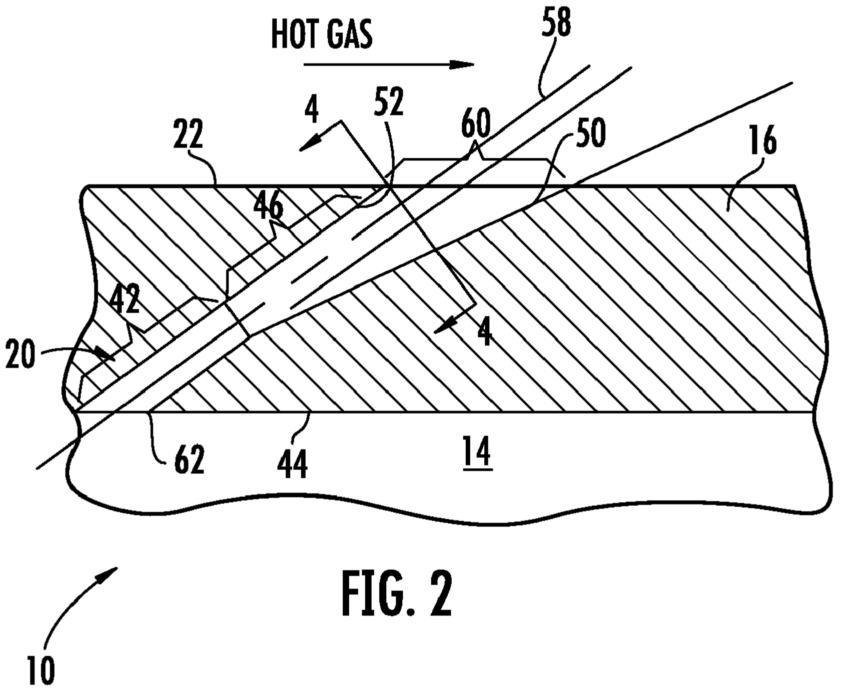
FIG. 2 is cross-sectional, detailed view, referred to as a filleted view, of a divergent film cooling hole of the turbine airfoil shown in FIG. 1 taken along line 2-2.

As shown in FIGS. 1-6, this invention is directed to a turbine airfoil cooling system 10 for a turbine airfoil 12 used in turbine engines. In particular, the turbine airfoil cooling system 10 is directed to a cooling system 10 having an internal cavity 14, as shown in FIG. 2, positioned between outer walls 16 forming a housing 18 of the turbine airfoil 12. The cooling system 10 may include a divergent film cooling hole 20 in the outer wall 16 that may be adapted to receive cooling fluids from the internal cavity 14, meter the flow of cooling fluids through the divergent film cooling hole 20, and release the cooling fluids into a film cooling layer proximate to an outer surface 22 of the airfoil 12. The divergent film cooling hole 20 may allow cooling fluids to diffuse to create better film coverage and yield better cooling of the turbine airfoil.

The turbine airfoil 12 may be formed from a generally elongated airfoil 24. The turbine airfoil 12 may be a turbine blade, a turbine vane or other appropriate structure. In embodiments in which the turbine airfoil 12 is a turbine blade, the airfoil 24 may be coupled to a root 26 at a platform 28. The turbine airfoil 12 may be formed from other appropriate configurations and may be formed from conventional metals or other acceptable materials. The generally elongated airfoil 24 may extend from the root 26 to a tip 30 and include a leading edge 32 and trailing edge 34. Airfoil 24 may have an outer wall 16 adapted for use, for example, in a first stage of an axial flow turbine engine. Outer wall 16 may form a generally concave shaped portion forming a pressure side 36 and may form a generally convex shaped portion forming a suction side 38. The cavity 14, as shown in FIG. 2, may be positioned in inner aspects of the airfoil 24 for directing one or more gases, which may include air received from a compressor (not shown), through the airfoil 24 and out one or more orifices 20, such as in the leading edge 32, in the airfoil 24 to reduce the temperature of the airfoil 24 and provide film cooling to the outer wall 16. As shown in FIG. 1, the orifices 20 may be positioned in a leading edge 32, a tip 30, or outer wall 16, or any combination thereof, and have various configurations. The cavity 14 may be arranged in various configurations and is not limited to a particular flow path.

The cooling system 10 may include one or more divergent film cooling holes 20 positioned in the outer wall 16 to provide a cooling fluid pathway between the internal cavity 14 forming the cooling system 10 and an environment outside of the airfoil 12. The divergent film cooling hole 20 may include a first section 42 extending from an inner surface 44 of the outer wall 16 into the outer wall 16 and a second section 46 extending from the first section 42 and terminating at an outer surface 22 of the outer wall 16. The first section 42 may be configured to meter the cooling fluids flowing from the internal cavity 14, through the first section 42 and into the second section 46. In one embodiment, the first section 42 may include a constant geometry such that the first section 42 includes a consistent cross-sectional area. The first section 42 may be cylindrical or may be formed from linear sides. In at least one embodiment, the first section 42 may have a generally rectangular cross-section.

The second section 46 may extend from the first section 42 and terminate at the outer surface 22. The second section 46 may include an ever expanding cross-sectional area extending from the first section 42 and terminating at the outer surface 22. The second section 46 may provide a larger film cooling hole breakout 66 and footprint 68 in the outer surface 22 than conventional designs, which translates into better cooling air film coverage on the outer surface 22. The first and second sections may have approximately equal lengths, as shown in FIG. 2, or may have any other appropriate length relationship. The first and second sections 42, 46 may extend along a longitudinal axis 58. As shown in FIG. 2, the longitudinal axis 58 of the divergent film cooling hole 20 may extend nonorthogonally through the outer wall 16. The longitudinal axis 58 of the embodiment shown in FIGS. 1-4 extends generally chordwise in the turbine airfoil, and the longitudinal axis 58 of the embodiment shown in FIGS. 5 and 6 extends nonparallel and nonorthogonal relative to the leading edge 32. For instance, the longitudinal axis 58 extends nonparallel to the direction of hot gas flow across the airfoil 12.

In at least one embodiment, as shown in FIGS. 2-6, the second section 46 may be formed from a bottom surface 50, which may be a downstream surface, a top surface 52 generally opposite to the bottom surface 50, a first side surface 54 that connects the top and bottom surfaces 52, 50 and a second side surface 56 generally opposite to the first side surface 52. In one embodiment, one or more of the bottom surface 50, top surface 52, first side surface 54 and second side surface 56 may be generally planar.

The bottom surface 50 of the second section 46 may extend from an intersection at the first and second sections 42, 46 toward an outer surface 22 of the outer wall 16 at an angle relative to a longitudinal axis 58 of the divergent film cooling hole 20 of between about five degrees and about fifteen degrees. In one embodiment, the bottom surface 50 may be positioned relative to the longitudinal axis 58 at about ten degrees. Angling the bottom surface 50 increases the flow of cooling fluids from the divergent film cooling hole 20.

Figure 3:
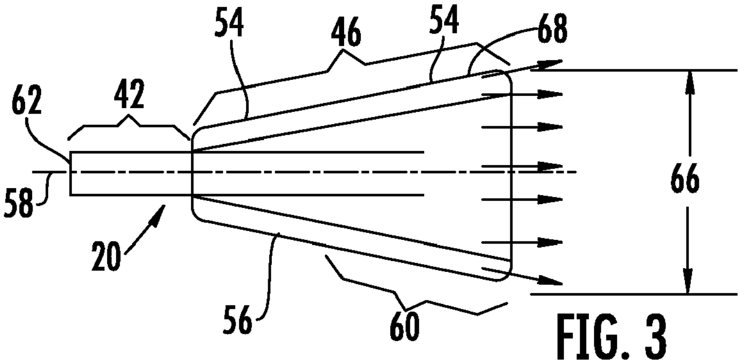
FIG. 3 is a top view of the divergent film cooling hole of FIG. 2.
Figure 4:
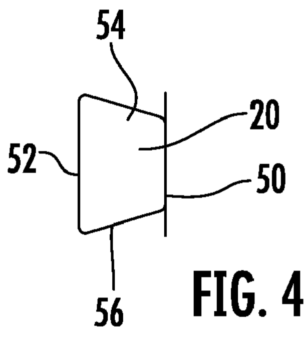
FIG. 4 is a cross-sectional view of the divergent film cooling hole of FIG. 2 taken along 4-4.

As shown in FIGS. 2-4, the first side surface 54 of the second section 46 may be positioned at an angle relative the longitudinal axis 58. In this embodiment, the first side surface 54 may be positioned between about five degrees and about fifteen degrees. In particular, the first side surface 54 may be positioned at about ten degrees relative to the longitudinal axis 58. Similarly, the second side surface 56 of the second section 46, which may be generally opposite to the first side surface 54, may be positioned at an angle relative to the longitudinal axis 58 of the divergent film cooling hole 20 of between about five degrees and about fifteen degrees, such that the second side surface 56 angles away from the first side surface 54. In particular, the second side surface 56 may be positioned at about ten degrees relative to the longitudinal axis 58.

The first side surface 54 may also be positioned at an angle in a different direction than described above such that an intersection between the top surface 52 and the first side surface 54 is further from the longitudinal axis 58 than an intersection between the bottom surface 50 and the first side surface 54, as shown in FIG. 3. As such, the top portion of the first side surface 54 is angled away from the longitudinal axis 58. In such a configuration, the first side surface 54 may be positioned between about ten degrees and about forty five degrees from a plane orthogonal to the bottom surface and parallel to the longitudinal axis 58. In particular, in one embodiment, the first side surface 54 may be positioned at about ten degrees from a plane orthogonal to the bottom surface and parallel to the longitudinal axis 58.

Similarly, the second side surface 56 may also be positioned at an angle such that an intersection between the top surface 52 and the second side surface 56 is further from the longitudinal axis 58 than an intersection between the bottom surface 50 and the second side surface 56, as shown in FIG. 3. As such, the top portion of the second side surface 56 is angled away from the longitudinal axis 58 and away from the first side surface 54. In such a configuration, the second side surface 56 may be positioned between about ten degrees and about forty five degrees from a plane orthogonal to the bottom surface and parallel to the longitudinal axis 58. In particular, in one embodiment, the second side surface 56 may be positioned at about ten degrees from a plane orthogonal to the bottom surface and parallel to the longitudinal axis 58. Such a configuration increases the size of the outlet 60 at the outer surface 22 to enhance the film cooling capabilities of the divergent film cooling hole 20.

Figure 5:
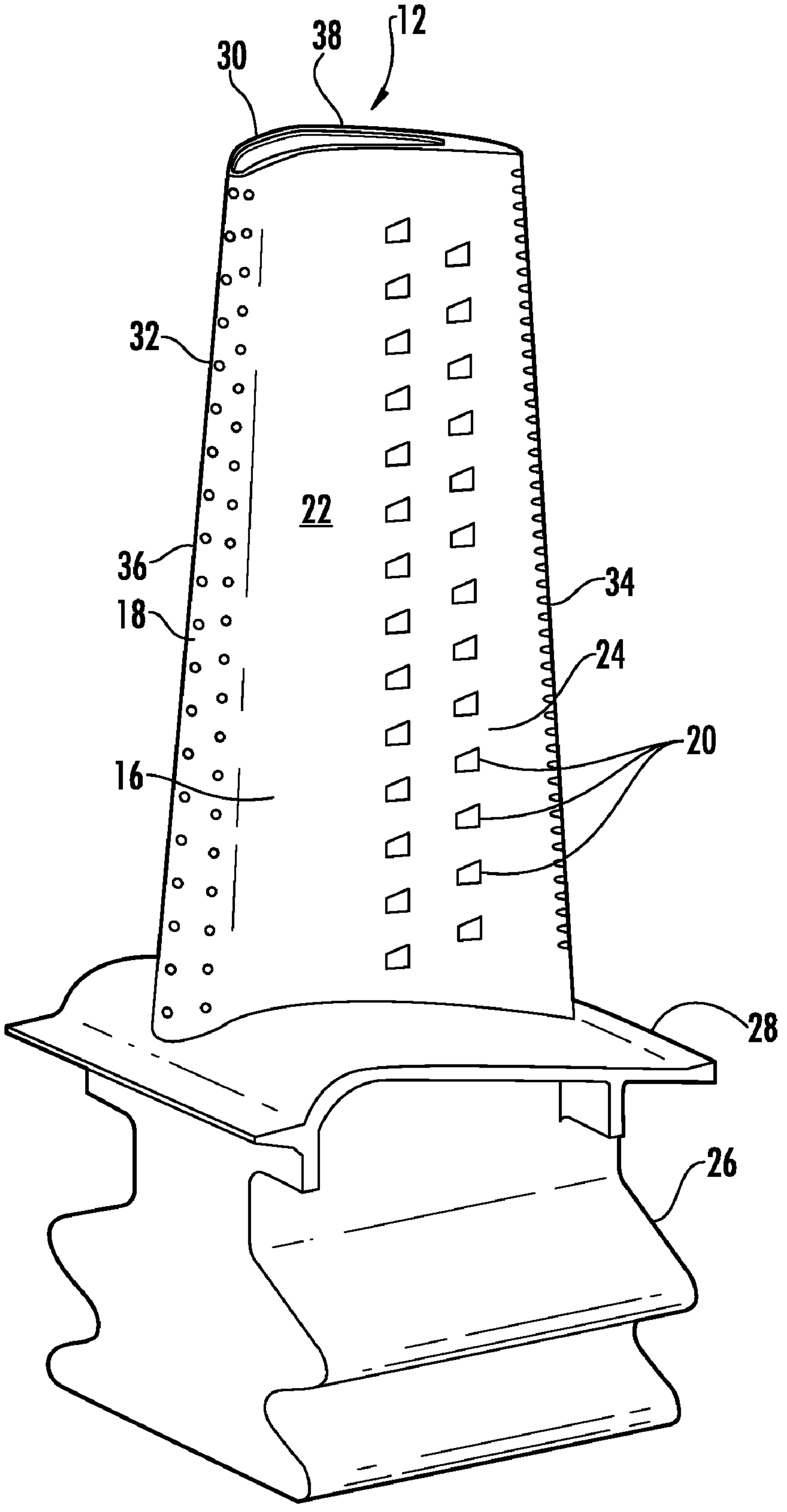
FIG. 5 is a perspective view of an alternative turbine airfoil having features according to the instant invention.
Figure 6:
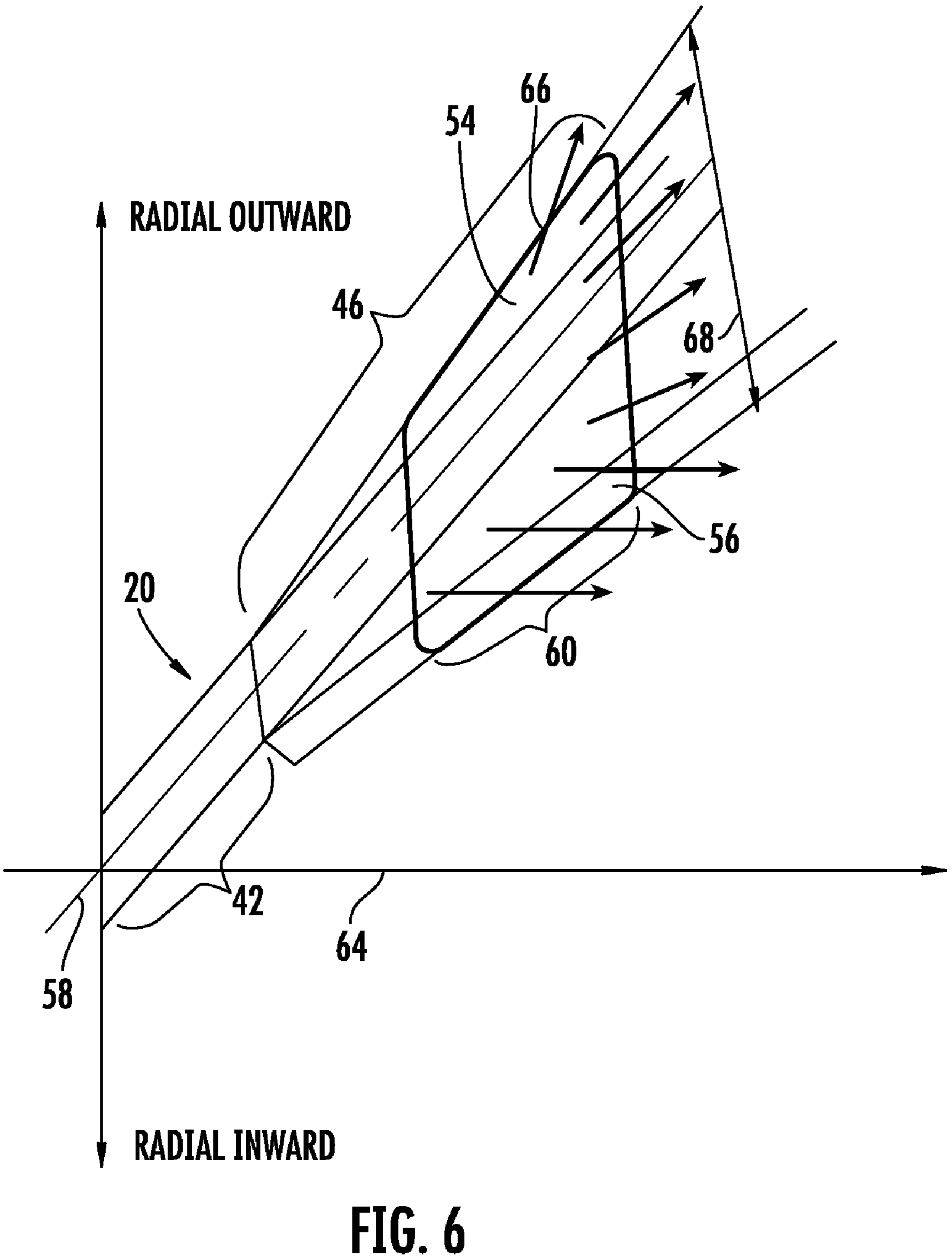
FIG. 6 is a top view of an alternative embodiment of the divergent film cooling hole.

In another embodiment, as shown in FIGS. 5-6, the longitudinal axis 58 of the divergent film cooling hole 20 is positioned nonparallel and nonorthogonal relative to the leading edge 32. In particular, the longitudinal axis 58 may be positioned such that an outlet 60 of the second section 46 is positioned radially outward more than an inlet 62 of the first section. More specifically, the longitudinal axis 58 of the divergent film cooling hole 20 may be positioned at an angle between about 15 degrees and about 85 degrees relative to an axis 64 in a chordwise direction. In another embodiment, the longitudinal axis 58 of the divergent film cooling hole 20 may be positioned at an angle between about 35 degrees and about 55 degrees relative to the axis 64 in a chordwise direction. In such configuration, the first side surface 54 of the second section 46 forming a radially outermost side may be positioned at an angle relative to the longitudinal axis 58 of the divergent film cooling hole 20 of between about zero degrees and about five degrees. The second side surface 56 of the second section 46, which is generally opposite to the first side surface 54, may be positioned at an angle relative to the longitudinal axis 58 of the divergent film cooling hole 20 of between about ten degrees and about twenty degrees. Thus, the upstream side of the divergent film cooling hole 20 has less expansion, which is less angular offset, than the downstream side because expansion may occur more easily in the downstream direction.

In the embodiment shown in FIGS. 5 and 6, the bottom surface 50 may be positioned at an angle relative to the longitudinal axis 58 of the divergent film cooling hole 20. The bottom surface 50 of the second section 46 may be generally planar and may extend from an intersection at the first and second sections 42, 46 toward the outer surface 22 of the outer wall 16 at an angle relative to a longitudinal axis 58 of the divergent film cooling hole 20 of between about five degrees and about fifteen degrees. In particular, the bottom surface 50 may be positioned at an angle such as, but not limited to, about ten degrees.

The embodiment shown in FIGS. 5 and 6 may also be configured such that the second side surface 56 may be positioned at a different angle from the longitudinal axis. Specifically, the second side surface 56 may be positioned at between about ten degrees and about forty five degrees from a plane orthogonal to a bottom surface 50 and parallel to the longitudinal axis 58. As such, the size of the outlet 60 is increased, thereby increasing the effectiveness of the divergent film cooling hole 20.

During operation, cooling fluids, such as gases, are passed through the cooling system 10. In particular, cooling fluids may pass into the internal cavity 14, enter the inlet 62 of the first section 42 of the divergent film cooling hole 20, pass through the first section 42, pass through the second section 46 and exit the divergent film cooling hole 20 through the outlet 60. The first section 42 may operate to meter the flow of cooling fluids through the divergent film cooling hole 20. The second section 46 may enable the cooling fluids to undergo multiple expansion such that more efficient use of the cooling fluids may be used during film cooling applications. Little or no expansion occurs at top surface, which is the upstream side, of the divergent film cooling hole. This configuration enables an even larger outlet 60 of the divergent film cooling hole 20, which translates into better film coverage and yields better film cooling. The second section 46 creates a smooth divergent section that allows film cooling flow to spread out of the divergent film cooling hole 20 at the outlet 60 better than conventional configurations. Additionally, the second section 46 minimizes film layer shear mixing with the hot gas flow and thus, yields a higher level of cooling fluid effectiveness.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A turbine airfoil, comprising:

a generally elongated airfoil having a leading edge, a trailing edge and at least one cavity forming a cooling system in the airfoil;

an outer wall forming the generally elongated airfoil and having at least one divergent film cooling hole positioned in the outer wall and providing a cooling fluid pathway between the at least one cavity forming the cooling system and an environment outside of the airfoil;

wherein the at least one divergent film cooling hole includes a first section extending from an inner surface of the outer wall into the outer wall and a second section extending the first section and terminating at an outer surface of the outer wall;

wherein a bottom surface of the second section is generally planar and extends from an intersection at the first and second sections toward the outer surface of the outer wall at an angle relative to a longitudinal axis of the at least one divergent film cooling hole of between about five degrees and about fifteen degrees;

wherein a first side surface of the second section is positioned at an angle relative to the longitudinal axis of the at least one divergent film cooling hole of between about five degrees and about fifteen degrees;

wherein a second side surface of the second section, which is generally opposite to the first side surface, is positioned at an angle relative to a longitudinal axis of the at least one divergent film cooling hole of between about five degrees and about fifteen degrees; and wherein the first side surface is positioned at an angle of between about ten degrees and about forty five degrees from a plane orthogonal to the bottom surface and parallel to the longitudinal axis.

2. The turbine airfoil of claim 1, wherein the bottom surface is positioned at an angle relative to the longitudinal axis of the at least one divergent film cooling hole of about ten degrees.

3. The turbine airfoil of claim 1, wherein the first side surface of the second section is positioned at an angle relative to the longitudinal axis of the at least one divergent film cooling hole of about ten degrees.

4. The turbine airfoil of claim 1, wherein the first side surface is positioned at an angle of about ten degrees from the plane orthogonal to the bottom surface and parallel to the longitudinal axis.

5. The turbine airfoil of claim 1, wherein the second side surface is positioned at an angle of between about ten degrees and about forty five degrees from a plane orthogonal to the bottom surface and parallel to the longitudinal axis.

6. The turbine airfoil of claim 5, wherein the second side surface is positioned at an angle of about ten degrees from the plane orthogonal to the bottom surface and parallel to the longitudinal axis.

7. The turbine airfoil of claim 1, wherein the second side surface of the second section, which is generally opposite to the first side surface, is positioned at an angle relative to the longitudinal axis of the at least one divergent film cooling hole of about ten degrees.

8. The turbine airfoil of claim 1, wherein the first and second sections of the at least one divergent film cooling hole have approximately equal lengths.

9. The turbine airfoil of claim 1, wherein the longitudinal axis of the at least one divergent film cooling hole extends generally chordwise in the turbine airfoil.

10. The turbine airfoil of claim 1, wherein a longitudinal axis of the at least one divergent film cooling hole is nonparallel and nonorthogonal with the leading edge.

11. The turbine engine of claim 10, wherein the longitudinal axis of the at least one divergent film cooling hole is positioned at an angle between about 35 degrees and about 55 degrees relative to an axis in a chordwise direction.

12. The turbine engine of claim 10, wherein the first side surface is positioned at an angle less than the second side surface relative to the longitudinal axis.

13. A turbine airfoil, comprising:

a generally elongated airfoil having a leading edge, a trailing edge and at least one cavity forming a cooling system in the airfoil;

an outer wall forming the generally elongated airfoil and having at least one divergent film cooling hole positioned in the outer wall and providing a cooling fluid pathway between the at least one cavity forming the cooling system and an environment outside of the airfoil;

wherein the at least one divergent film cooling hole includes a first section extending from an inner surface of the outer wall into the outer wall and a second section extending the first section and terminating at an outer surface of the outer wall;

wherein a longitudinal axis of the at least one divergent film cooling hole is nonparallel and nonorthogonal with the leading edge;

wherein a first side surface of the second section forming a radially outermost side is positioned at an angle relative to the longitudinal axis of the at least one divergent film cooling hole of between zero degrees and about five degrees; and wherein a second side surface of the second section, which is generally opposite to the first side surface, is positioned at an angle relative to a longitudinal axis of the at least one divergent film cooling hole of between about ten degrees and about twenty degrees.

14. The turbine airfoil of claim 13, wherein the second side surface is positioned at an angle of between about ten degrees and about forty five degrees from a plane orthogonal to a bottom surface and parallel to the longitudinal axis.

15. The turbine airfoil of claim 13, wherein the bottom surface of the second section is generally planar and extends from an intersection at the first and second sections toward the outer surface of the outer wall at an angle relative to a longitudinal axis of the at least one divergent film cooling hole of between about five degrees and about fifteen degrees.

16. The turbine airfoil of claim 15, wherein the bottom surface of the second section extends from an intersection at the first and second sections toward the outer surface of the outer wall at an angle of about ten degrees.

17. The turbine engine of claim 14, wherein the longitudinal axis is positioned such that an outlet of the second section is positioned radially outward more than an inlet of the first section.

18. The turbine engine of claim 17, wherein the longitudinal axis of the at least one divergent film cooling hole is positioned at an angle between about 15 degrees and about 85 degrees relative to an axis in a chordwise direction.

19. The turbine engine of claim 18, wherein the longitudinal axis of the at least one divergent film cooling hole is positioned at an angle between about 35 degrees and about 55 degrees relative to an axis in a chordwise direction.

* * * * *